United States Patent
Davydov et al.

(10) Patent No.: US 12,398,638 B2
(45) Date of Patent: Aug. 26, 2025

(54) METHOD FOR DETECTING SOLID PARTICLE PRODUCTION THROUGH AN IMPERMEABLE DOWNHOLE BARRIER

(71) Applicant: TGT Oil Well Equipment Factory—Sole Proprietorship L.L.C., Abu Dhabi (AE)

(72) Inventors: Dmitrii Aleksandrovich Davydov, g. Kazan (RU); Liliia Aleksandrovna Spirina, g. Ianaul (RU)

(73) Assignee: TGT Oil Well Equipment Factory—Sole Proprietorship L.L.C., Abu Dhabi (AE)

( * ) Notice: Subject to any disclaimer, the term of this patent is extended or adjusted under 35 U.S.C. 154(b) by 443 days.

(21) Appl. No.: 17/632,989

(22) PCT Filed: Jul. 21, 2021

(86) PCT No.: PCT/RU2021/050232
§ 371 (c)(1),
(2) Date: Feb. 4, 2022

(87) PCT Pub. No.: WO2022/025804
PCT Pub. Date: Feb. 3, 2022

(65) Prior Publication Data
US 2022/0275721 A1    Sep. 1, 2022

(30) Foreign Application Priority Data
Jul. 27, 2020   (RU) ........................ RU2020124902

(51) Int. Cl.
| | |
|---|---|
| *E21B 47/095* | (2012.01) |
| *E21B 47/107* | (2012.01) |
| *G01V 1/50* | (2006.01) |

(52) U.S. Cl.
CPC .......... *E21B 47/095* (2020.05); *E21B 47/107* (2020.05); *G01V 1/50* (2013.01)

(58) Field of Classification Search
CPC ....... E21B 47/095; E21B 47/107; G01V 1/50; G01V 1/42; G01V 2210/123
See application file for complete search history.

(56) References Cited

U.S. PATENT DOCUMENTS

| | | | |
|---|---|---|---|
| 4,240,287 A | 12/1980 | Mast et al. | |
| 5,214,251 A * | 5/1993 | Orban ................... | E21B 47/107 367/27 |

(Continued)

FOREIGN PATENT DOCUMENTS

| | | |
|---|---|---|
| CA | 3020223 | 10/2017 |
| EA | 200601138 | 10/2006 |

(Continued)

OTHER PUBLICATIONS

International Search Report for PCT/RU2021/050232, mailed Nov. 11, 2021, 2 pages.

(Continued)

*Primary Examiner* — Tarun Sinha
(74) *Attorney, Agent, or Firm* — Sughrue Mion, PLLC

(57) ABSTRACT

A method of detecting solid particles in a production zone includes stages at which: at least one well operating regime is established, where the presence of fluid flow carrying solid particles are both present along the wellbore or in one or more formations. At least one instrument for objective measurements of an acoustic signal amplitude is run in or pulled out of the well either at a constant speed or with intermittent stations. Acoustic signal amplitude is measured either at a station or while running in or pulling out of the well using at least one instrument for objective measurements of the acoustic signal amplitude. Acoustic signal amplitude measurement data obtained in the well is pro- (Continued)

cessed, and amplitude peaks in the recorded acoustic signal are detected. At each depth, the peak shape obtained during the measurement is compared with a reference one.

8 Claims, 5 Drawing Sheets

(56) References Cited

U.S. PATENT DOCUMENTS

| | | | |
|---|---|---|---|
| 5,257,530 | A | 11/1993 | Beattie et al. |
| 5,922,946 | A * | 7/1999 | Hirota ................. G01N 29/222 73/61.71 |
| 6,672,131 | B1 | 1/2004 | Aldal et al. |
| 2005/0126777 | A1 * | 6/2005 | Rolovic ................. E21B 47/10 166/255.1 |
| 2007/0047867 | A1 | 3/2007 | Goldner |
| 2020/0041395 | A1 * | 2/2020 | Swett ..................... G01N 9/002 |

FOREIGN PATENT DOCUMENTS

| | | |
|---|---|---|
| RU | 2 499 283 | 11/2013 |
| RU | 2 662 738 | 7/2018 |

OTHER PUBLICATIONS

Written Opinion of the ISA for PCT/RU2021/050232, mailed Nov. 11, 2021, 4 pages.

* cited by examiner

Time

METHOD FOR DETECTING SOLID PARTICLE PRODUCTION THROUGH AN IMPERMEABLE DOWNHOLE BARRIER

This application is the U.S. national phase of International Application No. PCT/RU2021/050232 filed 21 Jul. 2021, which designated the U.S. and claims priority to RU patent application No. 2020124902 filed 27 Jul. 2020, the entire contents of each of which are hereby incorporate by reference.

TECHNICAL FIELD

The invention relates to the petroleum industry. More specifically, this invention pertains to the method of detecting zones of solids (sand, proppant) production in a well where solid particles are carried by fluid and gas flow, in those cases when the solids production zone is situated behind an impermeable barrier.

BACKGROUND ART

The presence of sand in a flow of transported gas or fluid leads to excessive wear of shaped parts. Timely detection of sand production in the wellbore will allow making prompt adjustments in the well flow regime, thereby preventing negative consequences, such as damage to the bottomhole zone, and avoiding extra costs for well servicing and workover.

US20070047867 A1 of 1 Mar. 2017, titled "Sonic Fibre Optic Sand Detector", describes a method of sand detection using a fibre optic system. This system comprises one of several sonic sensor sections which are set in optic fibre and make up an interferometer by means of a fibre Bragg grating. Acoustic signal causes a change of the fibre optic path length in the interferometer, bringing about a change in the optical intensity of light which is further on detected by appropriate electronic equipment. As sand enters the wellbore, the sonic profile in the wellbore will change. This change is analysed and identified using suitable electronic equipment.

The drawbacks of the system are low sensitivity of the fibre optic system due to additional screening by the well medium, unavailability of reference sonic signature in the well where no sand production takes place, and impossibility to count the produced solid particles.

Canadian Patent No. 3020223 of 12 Oct. 2017, titled "Well Sand Production Zone Detection", describes a method that consists in detecting a broadband signal and comparing it with a reference signal measured by a fibre optic system. Detection of a broadband signal includes frequency filtration and locating spectral centroid and spectral spread. Sand production in the wellbore is identified based on the fact that the centroid and spread values are higher than the threshold values. The sand count at a certain depth in the wellbore is determined on the basis of spectral energy.

The drawbacks are low sensitivity, difficulties in selecting an optimal threshold, and inaccuracy in counting the produced sand particles.

U.S. Pat. No. 6,672,131 of 6 Jan. 2004, titled "Method for Operating a Measuring Instrument", discloses a method of registering sand particles using a wellhead instrument containing an active sensor to transmit acoustic signals and a passive sensor to receive signals. Afterwards the transmitted pulse is compared with the received one and amplification settings are determined in order to achieve the desired ratio between the transmitted and received signals. The signal from the sensor passes through one or several frequency filters. The noise generated by fluid flow through a pipe is measured by sample tests of the measuring system, either manually or automatically. Sand production is detected by a sharp increase of the noise generated by wellbore flow.

The drawback of the methods is the lack of information about the sand producing zone location and amount of produced sand.

U.S. Pat. No. 5,257,530 of 2 Nov. 1993, titled "Acoustic Sand Detector for Fluid Flowstreams", discloses a method for determining the rate of sand production by a system having a metal probe interposed in a flow conduit or transmitting acoustic emissions created by particles impacting the probe. A detector with maximum sensitivity in the range of 300-800 kHz is installed on the outside of the flow line to receive acoustic signals generated by the probe. To detect sand particles, acoustic energy of the received signal is calculated and then compared with the threshold value. Sand particles mass is calculated from the energy of their acoustic impact.

The drawbacks of this method are the difficulty in selecting an optimal threshold and absence of information on sand production zones.

The closest to the proposed method is the method of sand detection wherein sand particles come in contact with a piezoelectric element (U.S. Pat. No. 4,240,287 of 23 Dec. 1980, titled "Sand Detection"). After amplification the signal is sent to a frequency filter so that only those components of the amplified signal that have a frequency of 50-500 kHz can pass through. The peak value of the resulting electric output signal is found in the pulse height discriminator. When the peak value exceeds the preset level of discrimination, a standard output pulse with a length in excess of the typical sand grain impact duration is generated. The pulses are counted within a certain period of time. At a given flow velocity, sand grains can be differentiated by their size due to the fact the pulse height ranges in the discriminator are different.

The drawbacks of the method are inaccuracy in determining particles size and locating sand production zone due to the absence of a method for differentiating sand grains moving along the wellbore from sand grains produced from the formation.

DETAILED DESCRIPTION

The problem to be solved by means of the claimed invention pertains to the detection of solid particles production zone through a barrier separating the detecting instrument from the direct contact with the solid particles, e.g. through a production casing or a tubing string.

The technical result of the claimed invention consists in an increased accuracy of detecting solid particles in a well in the cases when there is no direct contact between the produced solid particles and the detecting instrument.

The technical result of the claimed invention is achieved due to the fact that the solids production zone detection method includes the stages at which at least one well operating regime is established, which is characterised by the presence of a flow carrying solid particles both along the wellbore and in one or more formations; at least one instrument for objective measurements of the acoustic signal amplitude is run in or pulled out of the well either at a constant speed or at stations; the acoustic signal amplitude is measured either at a station or while running in or pulling out of the well using at least one instrument for objective measurements of the acoustic signal amplitude; the acoustic signal amplitude measurement data are obtained and processed, detecting amplitude peaks in the recorded acoustic signal; at each depth, the peak shapes obtained during the measurements are compared with the reference one, distinguishing only those peaks that correspond to the impacts of solid particles; the number of solid particles is counted; and the zone of solid particles production in the wellbore is identified.

In a particular embodiment of the claimed invention, when the measurements are taken while running in or pulling out of the well, the number of solid particles is counted at one-second intervals.

In a particular embodiment of the claimed invention, when the measurement are taken at stations, the number of solid particles is counted for each station.

In a particular embodiment of the claimed invention, the duration of a stationary measurement is 10 seconds or more.

In a particular embodiment of the claimed invention, the distance between stations is equal to the length of the instrument for objective measurement of the acoustic signal amplitude.

In a particular embodiment of the claimed invention, the acoustic signal amplitude is measured using three acoustic signal amplitude measuring instruments simultaneously, with the distance between stations being three times longer than the length of the instrument for objective measurement of the acoustic signal amplitude.

In a particular embodiment of the claimed invention, the instrument for objective measurement of acoustic signal amplitude is run in at a constant speed of maximum six meters per second for the instrument one metre long, with additional rubber centralizers being installed.

In a particular embodiment of the claimed invention, an additional surface sensor is installed to monitor solid particles production.

One distinctive feature of the invention is that the impacts of solid particles with the barrier that separates the solid particle production source from the measuring instrument can be recognised and differentiated from other types of impacts (gas or air bubble strikes, mechanical shocks) in time domain, due to which the false peaks can be eliminated, thereby enhancing the accuracy of solid particles detection in the well.

Another distinctive feature of the invention is that the impacts of solid particles carried by the fluid from the formation and screened from the instrument by the barrier can be differentiated from the impacts of solid particles moving along the wellbore and directly striking the instrument body, due to which the accuracy of solid particles production zone detection is enhanced, thereby providing the desired technical result.

BRIEF DESCRIPTION OF THE DRAWINGS

Details, features and advantages of this invention ensue from the description of the embodiments of the claimed invention given below and the following drawings:

FIG. 3—30/60 mesh proppant;

FIG. 4—Oscillogram of one 30/60 mesh proppant particle impact with a barrier that separates the measuring instrument body from the detected solid particles;

FIG. 5—20/40 mesh proppant;

FIG. 6—Oscillogram of one 20/40 mesh proppant particle impact with a barrier that separates the measuring instrument body from the detected solid particles;

FIG. 7—Oscillogram of an air bubble collapsing upon an impact with the measuring instrument body;

FIG. 8—Laboratory unit schematic;

FIG. 9—Result of applying the proposed method of solid particle production zone detection using the laboratory unit;

FIG. 10—The result of applying the proposed method of solid particle production zone detection using the laboratory unit;

Figure 1:
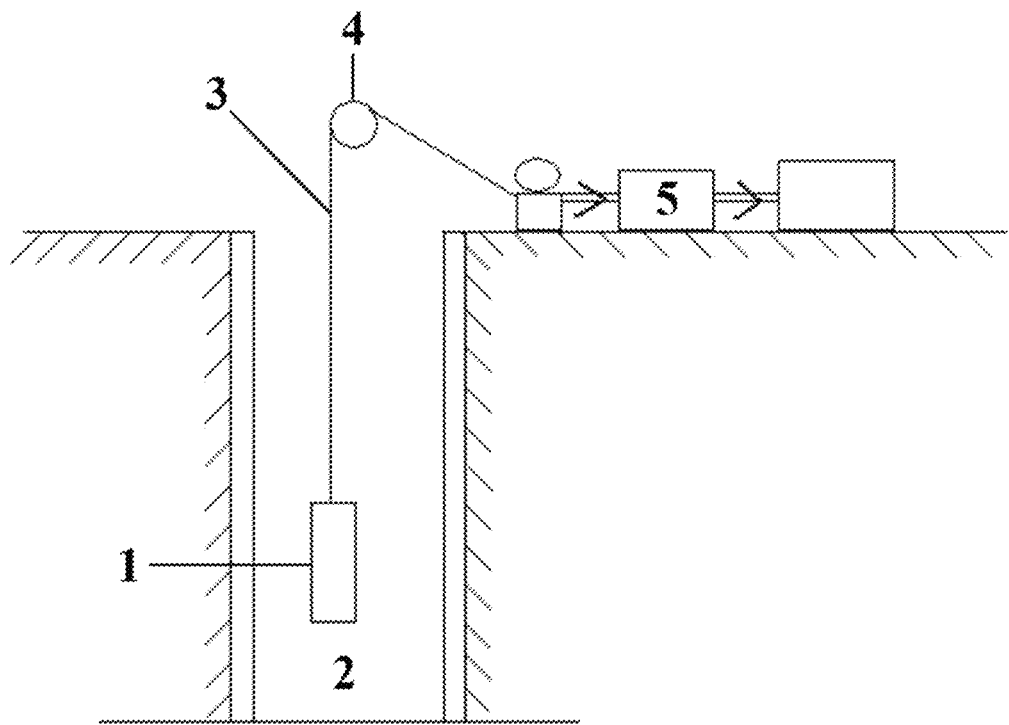
FIG. 1—Schematic representation of the measuring instrument deployment in a well.

The following items are numbered in the figures: 1—Measuring instrument; 2—Well; 3—Cable; 4—Sheave; 5—Tilt gear; 6—Measuring unit; 7—Pipe; 8—Holding tank for solid particles; 9—Motor; 10—Pure fluid (liquid or gas) feed tube; 11—Dispenser; 12—Pipe opening; 13—Acoustic log; 14—Energy panel; 15—Low-energy particles; 16—Solid particles count column.

DISCLOSURE OF THE INVENTION

The method of detecting solid particle production zones in a well is accomplished by making a distinction between the solid particles impacts with the barrier that separates the sand production source from the measuring instrument, and other types of impacts (gas or air bubbles, mechanical shocks) in time domain. A tubing string or a production casing string may serve as the barrier, if the sand production source is located behind the pipe.

The claimed solids production zone detection method comprises the following:

Establishing at least one well operating regime characterised by the presence of fluid flow carrying solid particles (sand, proppant) both along the wellbore and in one or more reservoir zones;

Measuring the amplitude of acoustic signals generated by the reservoir fluid flow;=

Detecting amplitude peaks in the recorded acoustic signal;

Comparing the resulting peak shapes at each depth with the reference one;

Distinguishing only those peaks that correspond to the impacts of solid particles;

Counting the number of solid particles;

Identifying the solid particles production zone in the wellbore.

Increasing the number of regimes to more than one will further enhance the accuracy of the results.

For additional monitoring of solid particles production and selection of the optimal operating regime, an additional solid particle surface detector is installed.

A distinctive feature of the invention is that the impacts of solid particles with the barrier that separates the solid particles production source from the measuring instrument body can be differentiated in time domain from the impacts of non-solid particles, such as gas or fluid bubbles, the instrument impacts with the wellbore walls, impacts of particles and bubbles directly with the instrument body, due to which the false peaks can be eliminated, enhancing the accuracy of solid particles production zone detection. The impacts of solid particles are recognised in time domain by comparing the reference peaks caused by solid particles impacts (sand, proppant) with the peaks that have been detected in the data, using the machine learning method.

The reference peaks from solid particle (sand, proppant) impacts are recorded in advance in laboratory conditions.

In further detail, the method of solid particle production zone detection includes establishing at least one well operating regime characterised by the presence of fluid flow carrying solid particles (sand, proppant) both along the wellbore and in one or more reservoir zones.

The measurements using the instrument for objective measurement of the acoustic signal amplitude are performed while the instrument is run in the hole, or remains at station, or pulled out of the hole.

FIG. 1 shows a schematic representation of the measuring instrument (1) deployment in the well (2). The instrument (1) position in the well (2) is adjusted by the cable (3) which is positioned above the sheave (4) and is connected to the tilt gear (5).

Measurements can also be performed while the instrument is being run in or pulled out of the well, and, in the process of running the instrument in or pulling out of the hole, measurements can also be taken at stations. Stationary measurements are preferable because in this case any noise generated by the instrument motion will be naturally excluded.

The duration of a stationary measurement can be 10 or more seconds. The minimum detectable amount of sand depends on the duration of a stationary measurement. A time interval of 10 seconds is the minimum time at a station that the conveyance equipment currently in use can support. This being the case, the number of solids particles that can be reliably detected by this instrument will be 1 particle per 10 seconds (0.1 particle per second).

The recommended distance between stations is equal to the length of measuring equipment so that the entire depth range can be surveyed. However, this distance can be made either shorter or longer, depending on the total survey time because the entire body of the measuring instrument responds to the solid particle impacts. It should be noted that several instruments for measurement of acoustic signal amplitude can be used simultaneously during the survey and in this case the distance between stations can be increased proportionally to the number of instruments (for example, if three instruments are used at the same time, the distance between stations should be increased to three lengths of the measuring equipment).

When the survey is conducted at a constant speed (during continuous logging), speed limitations, e.g. maximum six metres per minute, should be observed. The logging speed also affects the minimum detectable number of solid particles. The acceptable continuous logging speed is determined according to the measuring equipment length. For example, if the measuring instrument is 1 metre long, the continuous logging speed of 6 metres per second will be equivalent to a 10-second stationary measurement, which is sufficient for reliable detection of the number of solid particles in the well flow at a rate of 0.1 particle per second or higher. Rubber centralizers can be used during the survey in order to reduce the acoustic noise generated by the instrument friction against the wellbore walls.

The source data recorded by the instrument for objective measurement of acoustic signal amplitude should be processed in time domain to detect solid particles production zone in the well.

Figure 2:
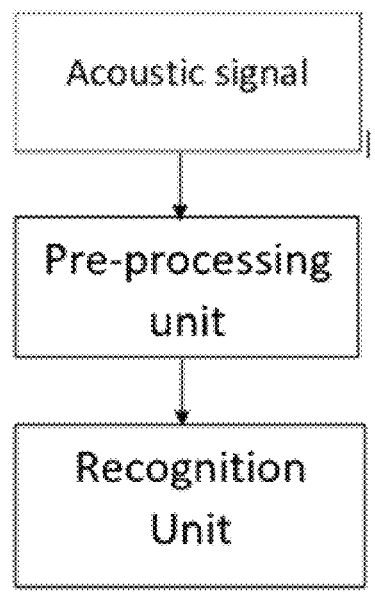
FIG. 2—Solid particle detection method flow diagram according to the invention.

A flow diagram of the proposed method is given in FIG. 2. Initially, the source data are sent to the pre-processing unit. The pre-processing phase may include peak detection or feature extraction, or both peak detection and feature extraction at the same time.

Figure 3:
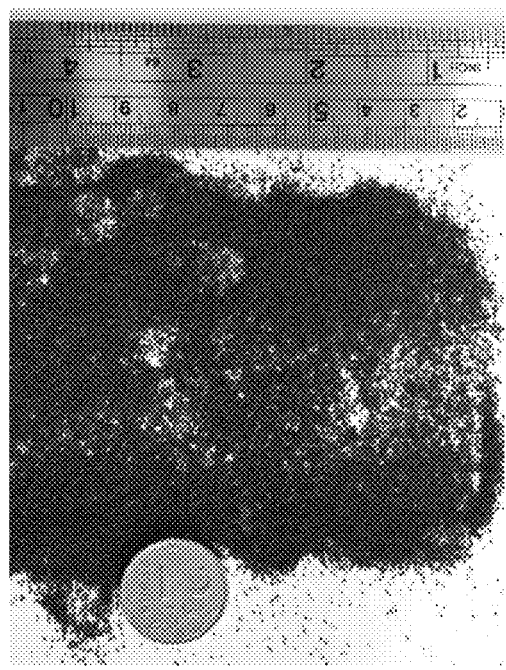
Figure 4:
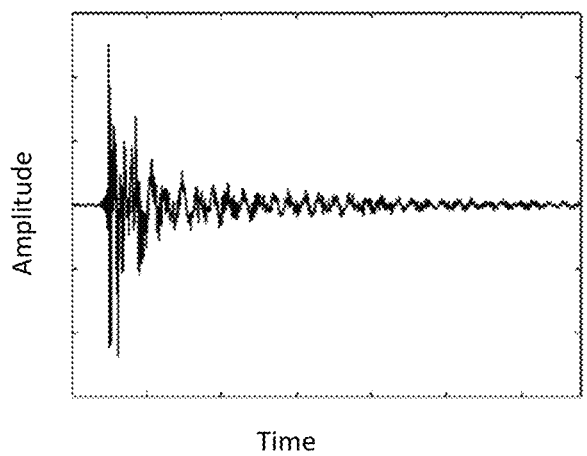
Figure 5:
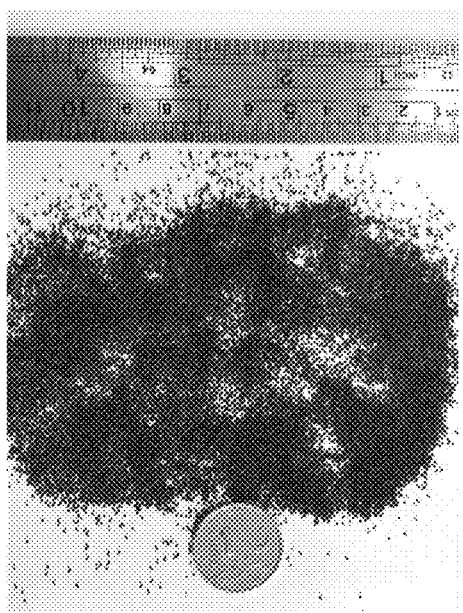
Figure 6:
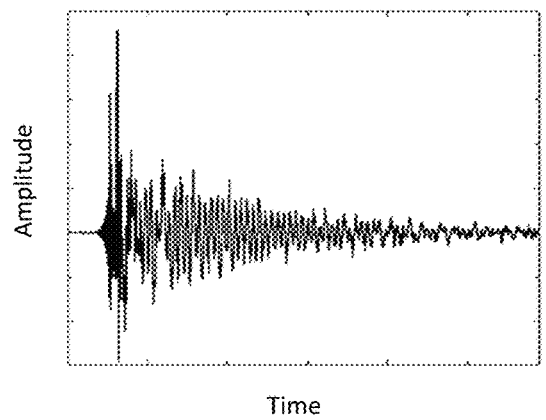

A peak is generated upon collision of solid particles (sand or proppant grains) with the barrier that separates the solid particle production source from the measuring instrument body. FIG. 4 and FIG. 6 show the peaks generated by proppant particles of different size: 30/60 mesh (FIG. 3) and 20/40 mesh (FIG. 5), respectively. The peak detection can identify the initial and final peak points in a large volume of acoustic data. It allows segmenting and isolating the peaks of interest. The detection can be done using different methods, such as fractal analysis, wavelet transformation, or spectral analysis (acoustic energy, allocated frequency band). This phase may be omitted and in this case all measured acoustic data will be sent to the recognition unit.

Figure 7:
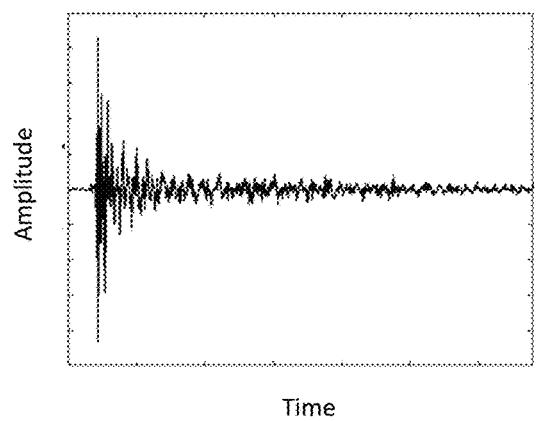

Acoustic characteristics of the peaks can be extracted and represented in a compact form by selecting their distinguishing features. Such characteristics as mel-cepstral coefficients, line spectrum pairs, cepstral linear prediction coefficients, spectral centroid and spectral spread, autoregressive model coefficients, momentary energy, formant frequencies, pitch frequency or zero-crossing frequency may serve as such distinguishing features. If this stage is omitted, the source acoustic data will be sent to the recognition unit. The recognition unit recognises the sound caused by a sand grain impact, using, for example, the machine learning method. This unit is an important part of the detection method because it separates the peaks caused by solid particles impacts (sand, proppant) (FIGS. 4 and 6) with the measuring instrument body from other peaks (gas or air bubble strikes, mechanical shocks) (FIG. 7). The recognition process can be carried out using support vector machines, nearest neighbour method, artificial neural networks, or hidden Markov models.

After recognition the solid particles are counted and visualised as a graph, with depth measured on the vertical axis and rate of particles per second on the horizontal axis. If the downhole measurements have been taken during continuous logging, the number of particles is counted for each second. If the downhole measurements have been taken at stations, the number of particles is counted for each station.

If the downhole measurements have been taken at stations, for an accurate identification of solids production zone an energy panel can be plotted and visualised in the form of a colour panel where depth is measured on the vertical axis and time on the horizontal axis, and colour represents the particle energy (from a light colour for low energy to a dark colour for high energy). The energy is estimated for each detected peak caused by a solid particle impact. Then the estimated energies are averaged within the limits of one second.

This procedure should be performed for each well operating regime.

Case 1

Detecting solids production zones with a laboratory unit simulating a fluid flow carrying solid particles.

Figure 8:
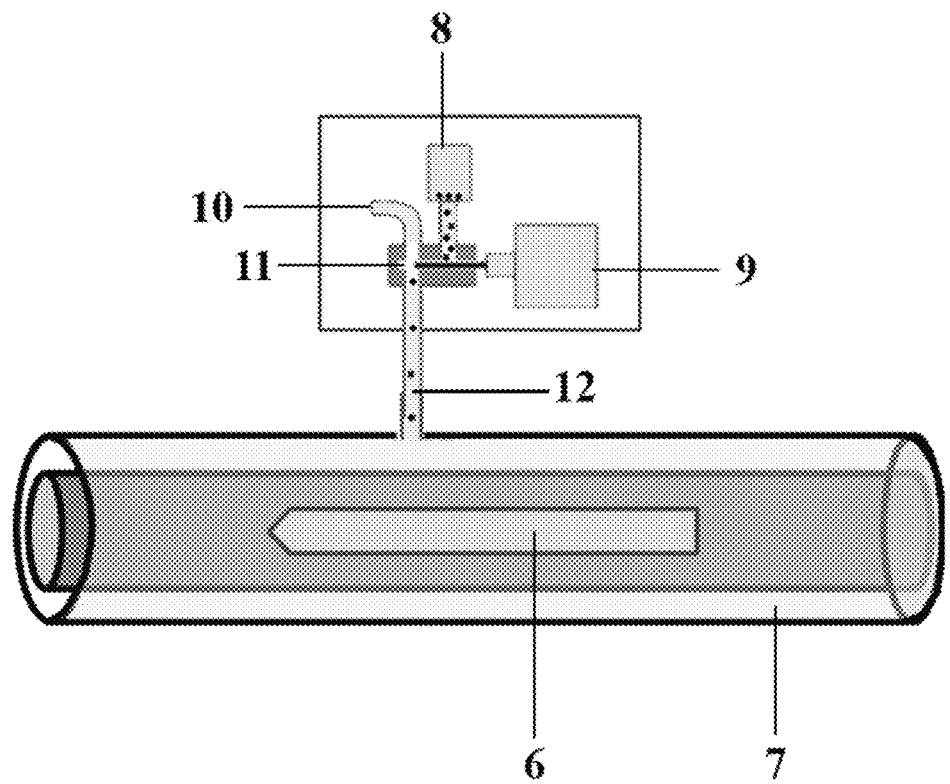

The laboratory unit schematic is shown in FIG. 8. It consists of two pipes (7), one inside the other, 88.9 and 150 mm in diameter and 6 metres long. The measuring instrument (6) is placed inside the inner pipe. A required quantity of particles is transported by motor power (9) from holding tank (8) to dispenser (11) at a specified rate. In the dispenser the particles are mixed with fluid or gas flow arriving from pure fluid feed tube (10). After that the particles are carried by the fluid into the annulus through a 14 mm opening (12) which imitates a downhole perforation.

During the test, the water flow rate inside the pipe was 25 l/min and a mixture of water with 20/40 mesh solid particles (proppant) was injected through the opening at a rate of 1 l/min, with the sand grains striking on the pipe inner surface. The average solids production rate was 20 grains per second.

Figure 9:
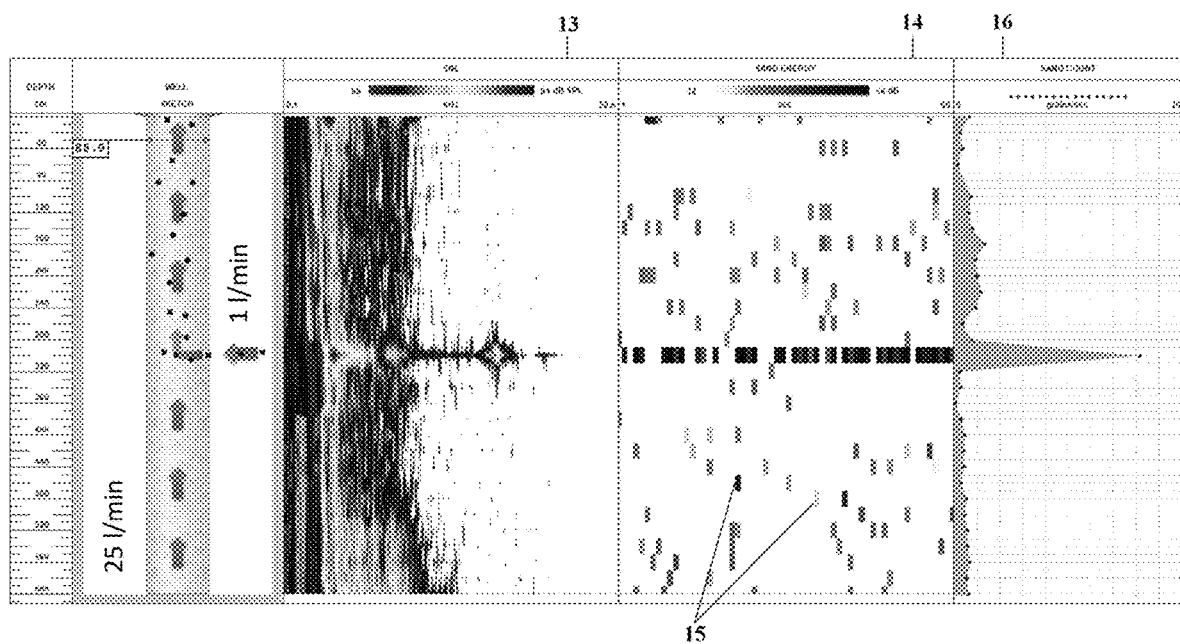

A downhole acoustic logging tool was used as the instrument for objective measurement of the acoustic signal amplitude. According to the technology, at the first stage the downhole acoustic logging tool measurements were made at stations. Then, at the second stage, the source acoustic data were processed (FIG. 9).

The spectral acoustic log panel (13) shows a low-frequency acoustic signal generated by water flow along the pipe and a noise peak at the opening through which water with solid particles flows out. As a result, it can be seen on the energy panel (14) that the most frequent and high-energy peaks caused by solid particle impacts with the downhole acoustic logging tool occurred at the hole from which the solid particles arrived. The solid particle count column (16) shows that the solid particles production zone is located at the opening through which the solid particles arrived.

Case 2

Figure 10:
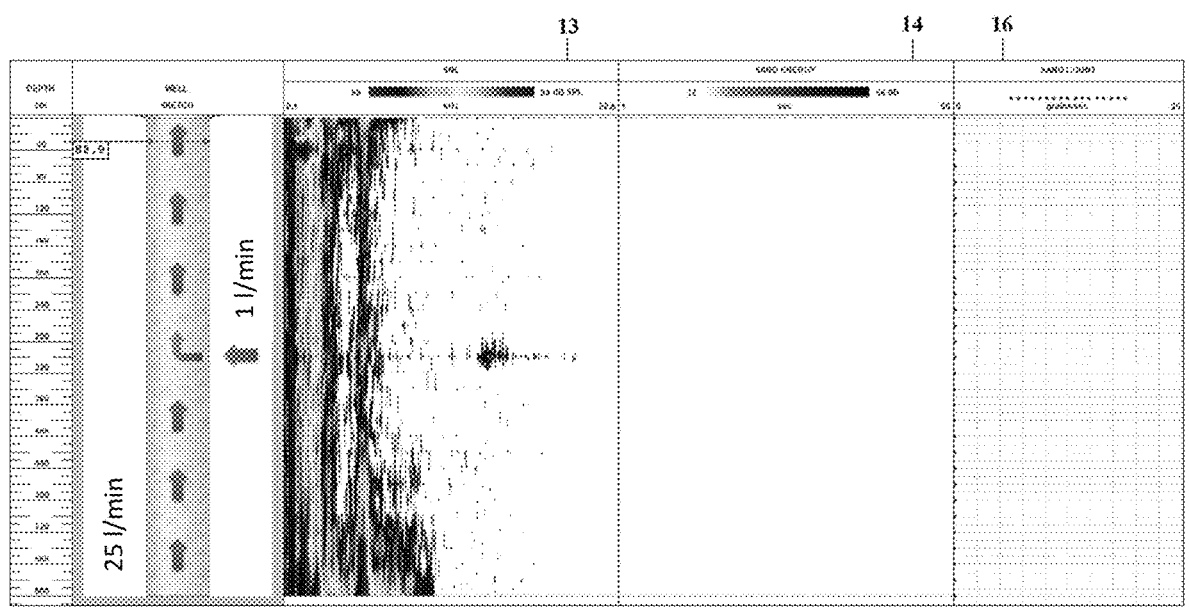

Detecting solids production zones with a laboratory unit simulating a fluid flow without solid particles (FIG. 10). During the test, the water flow rate inside the pipe was 25 l/min and pure water was injected through the opening at a rate of 1 l/min.

The downhole logging tool measurements were taken at stations and the initial acoustic data were processed according to the plan described in Case 1. The spectral acoustic log panel (13) shows a low-frequency acoustic signal generated by the water flow along the pipe and a noise peak at the opening through which pure water without solid particles flows out. The proposed method detected no solid particles during this test. The solid particle count column (16) shows zero at all stations and the energy panel (14) is empty.

What is claimed is:

1. The method of detecting solid particles in a production zone, including the stages at which:
    at least one well operating regime is established, wherein the presence of fluid flow carrying solid particles are both present along the wellbore or in one or more formations;
    at least one instrument for objective measurements of an acoustic signal amplitude is run in or pulled out of the well either at a constant speed or with intermittent stations;
    acoustic signal amplitude is measured either at a station or while running in or pulling out of the well using at least one instrument for objective measurements of the acoustic signal amplitude;
    acoustic signal amplitude measurement data obtained in the well is processed,
    detecting amplitude peaks in the recorded acoustic signal;
    at each depth, the peak shape obtained during the measurement is compared with a reference one, in order to distinguish peaks caused by impacts of solid particles with the at least one instrument for objective measurements of the acoustic signal amplitude from peaks caused by impacts of particles other than solid particles with the at least one instrument for objective measurements of the acoustic signal amplitude, using a machine learning method;
    solid particles are counted; and
    the zone of solid particles production in the wellbore is identified.

2. A method according to claim 1 wherein the number of solid particles during a downhole measurement is estimated at one-second intervals, either when running in or pulling out of the well.

3. A method according to claim 1 wherein during downhole measurement at stations the number of solid particles is estimated for each station.

4. A method according to claim 1 wherein the duration of measurement at a station is 10 seconds or longer.

5. A method according to claim 1 wherein the distance between stations is equal to the length of the instrument for objective measurement of the acoustic signal amplitude.

6. A method according to claim 1 wherein the acoustic signal amplitude is measured using three acoustic signal amplitude measuring instruments simultaneously, with the distance between stations being three times longer than the length of the instrument for objective measurement of the acoustic signal amplitude.

7. A method according to claim 1 wherein the instrument for objective measurement of the acoustic signal amplitude is run in or pulled out at a constant speed of maximum six meters per second for an instrument one metre long.

8. A method according to claim 1 wherein an additional surface sensor is installed to monitor solid particles production.

* * * * *